United States Patent
Clerc et al.

(10) Patent No.: US 6,190,802 B1
(45) Date of Patent: Feb. 20, 2001

(54) TRANSITION METAL BASED CERAMIC MATERIAL AND ELECTRODES FABRICATED THEREFROM

(75) Inventors: Daryl Clerc, Dexter; Matthew Fay, Ypsilanti; Levi Thompson, Northville; Michael Wixom, Ann Arbor, all of MI (US)

(73) Assignee: T/J Technologies, Inc., Ann Arbor, MI (US)

( * ) Notice: Under 35 U.S.C. 154(b), the term of this patent shall be extended for 0 days.

(21) Appl. No.: 09/315,169

(22) Filed: May 20, 1999

Related U.S. Application Data

(60) Provisional application No. 60/086,540, filed on May 22, 1998.

(51) Int. Cl.$^7$ .............................. H01M 4/40; H01M 4/48; C04B 35/48; C04B 35/46
(52) U.S. Cl. .................................. 429/231.2; 429/231.1; 429/231.5; 423/406; 423/608; 501/103; 501/134
(58) Field of Search ...................... 423/406, 351, 423/385, 608, 593; 429/218.1, 231.2, 231.5; 501/134, 102, 103

(56) References Cited

U.S. PATENT DOCUMENTS

| | | | |
|---|---|---|---|
| 5,286,582 | * | 2/1994 | Tahara et al. . |
| 5,589,298 | | 12/1996 | Takada et al. . |
| 5,702,843 | * | 12/1997 | Mitate et al. . |
| 5,721,070 | * | 2/1998 | Shackle . |
| 5,754,394 | | 5/1998 | Evans et al. ........................ 361/516 |
| 5,834,139 | * | 11/1998 | Shodai et al. . |
| 5,856,043 | * | 1/1999 | Ohsaki et al. . |
| 5,888,669 | * | 3/1999 | Thompson, Jr. et al. . |

FOREIGN PATENT DOCUMENTS

08078018 * 3/1996 (JP) .............................. H01M/4/58

* cited by examiner

*Primary Examiner*—Carol Chaney
*Assistant Examiner*—Tracy Dove
(74) *Attorney, Agent, or Firm*—Gifford, Krass, Groh, Sprinkle, Anderson & Citkowski, P.C.

(57) ABSTRACT

A transition metal based ceramic material having the general formula $Li_\alpha M_{1-\beta} T_\beta N_x O_{67}$, wherein M is a transition metal, T is a dopant metal, and wherein x is greater than 0 and less than or equal to 1, δ is 0, or less than or equal to 4; α is less than or equal to 3−x, and β is less than 1 is disclosed. The ceramic material has utility as a cathode material for rechargeable lithium batteries.

18 Claims, No Drawings

TRANSITION METAL BASED CERAMIC MATERIAL AND ELECTRODES FABRICATED THEREFROM

RELATED APPLICATION

This patent application claims priority of Provisional Patent Application Ser. No. 60/086,540 filed May 22, 1998.

FIELD OF THE INVENTION

This invention relates generally to synthetic materials. More specifically, the invention relates to ceramic materials, and in particular to ceramic materials comprised of transition metal nitrides which incorporate a group I element, particularly lithium, therein, and which are doped with metals and/or metal oxides. The invention further relates to electrodes incorporating these materials, and in particular to cathodes for rechargeable lithium batteries.

BACKGROUND OF THE INVENTION

Rechargeable batteries are of ever increasing importance as power supplies for a variety of items. One important class of rechargeable batteries comprises rechargeable lithium batteries, and as used herein, the term is understood to include all types of rechargeable lithium and lithium ion batteries.

The cathode is an important component of a lithium battery. During discharging and charging of the battery, lithium ions are inserted into and removed from the bulk of the cathode material respectively. Battery performance in terms of capacity, charging rate, discharge rate and life time will depend, among other things, upon the material properties of the cathode material. Some important parameters for a cathode material are its electrical conductivity and lithium transport properties. Stability is also important, as is cost and ease of fabrication.

Prior art cathode materials for lithium batteries are primarily based on metallic oxides, and in particular on oxides of nickel, manganese and cobalt. Representative cathode materials widely employed in the prior art include $LiMn_2O_4$, $LiCoO_2$ and $LiNiO_2$. In some instances, metal nitrides have been utilized in electrodes. U.S. Pat. Nos. 5,589,298 and 5,702,843 disclose the use of specific lithium metal nitrides as cathode materials for lithium batteries, and U.S. Pat. No. 5,754,394 discloses capacitor electrodes composed of metal nitrides.

As will be detailed hereinbelow, the present invention is directed to a unique class of ceramic materials. The base material thereof is generally a transition metal nitride, although it is to be understood that some proportion of oxygen may be present in the material, and in particular embodiments of the present invention, oxide or oxynitride materials are important dopants for the ceramics of the present invention. The materials of the present invention have very good electrical conductivity. Lithium is highly diffusive in the materials of the present invention, and they readily and reversibly allow for the insertion of lithium therein. The materials have a very stable lattice structure and this structure is preserved through repeated charge and discharge cycles. As will be further explained hereinbelow, the materials of the present invention include a dopant species which greatly enhances the beneficial properties thereof. These and other advantages of the invention will be apparent from the discussion, description and examples which follow.

BRIEF DESCRIPTION OF THE INVENTION

There is disclosed herein a transition metal based ceramic material of the general formula $Li_\alpha M_{1-\beta} T_\beta N_x O_\delta$ wherein M is a transition metal; T is a dopant metal, which may be present as a free metal or as one or more oxide or nitride compounds; and wherein x is less than or equal to 1; $\delta$ is 0, or less than or equal to 4; $\alpha$ is less than or equal to 3–x; and $\beta$ is less than 0.2. In particular embodiments, M is vanadium. The dopant metal may comprise one or more transition metals, and group III and IV transition metals are particularly preferred. In some specific embodiments, the dopant is comprised of scandium, yttrium, lanthanum, zirconium, titanium and/or hafnium. The dopant metal may be present in the material as oxides of the foregoing metals, nitrides thereof and combinations thereof.

In one specific embodiment, the transition metal of the ceramic comprises vanadium, and the dopant is based upon zirconium, most particularly a mixture of zirconium and zirconium oxide.

Also disclosed herein are rechargeable lithium batteries incorporating the foregoing materials in their cathodes.

DETAILED DESCRIPTION OF THE INVENTION

The present invention is directed to ceramic materials having the general formula $Li_\alpha M_{1-\beta} T_\beta N_x O_\delta$ wherein M is a host metal which is preferably a transition metal, and in one preferred embodiment is vanadium. T is a dopant metal; $\beta$ is less than one and most preferably less than 0.2; x is greater than 0 and less than or equal to 1; $\delta$ is 0, or less than or equal to 4; and $\alpha$ is less than or equal to 3–x. It is to be understood that the formulations of the present invention will include both stoichiometric compositions as well as nonstoichiometric compositions, and values of all of the subscripts may be increased by a common multiplier; that is to say, they may be scaled up, provided that the ratios therebetween are maintained.

The dopant metal T is most preferably one or more transition metals with group III and IV transition metals being most particularly preferred. It is to be noted that the dopant metal may be present as the free metal and/or as a compound such as an oxide oxynitride or nitride of the metal. For purposes of this disclosure, "dopant metals" shall be those metals represented by T in the generic formula. The more general term "dopant" shall refer to those metals as well as their various oxygen and nitrogen compounds. One specifically preferred group of transition metals used in the dopant comprises scandium, yttrium, lanthanum, hafnium, titanium, and zirconium as well as their oxides. It has been found that inclusion of relatively small amounts of the dopants greatly enhance the performance of the ceramic materials of the present invention, and while not wishing to be bound by speculation, it is assumed that the dopant distorts and expands the crystal lattice of the ceramic material thereby reducing the activation energy for lithium diffusion. It is also believed that the dopant may act as either a p-type or n-type material and thereby increase the electrical conductivity of the ceramic material. In particular instances, the dopant can act to create a two phase mixture which enables faster lithium transport toward active sites via grain boundaries. The dopant also acts to increase the overall capacity of batteries which incorporate the electrode material. It is also believed that the presence of dopant enhances the efficiency of the formation of the material.

The dopant may comprise a metal taken alone, a metallic oxide taken alone, a metallic nitride taken alone, a metallic oxynitride taken alone, or a combination of the foregoing. It is also to be understood that the dopant may comprise a mixture of different metals and compounds, and that in those instances where the dopant includes a metal and a metallic compound, the compound need not be a compound of the same metal that is used in the dopant; however, in many preferred formulations, the metal forming the compound is the same as the companion metal in the dopant mixture.

It has been found that particular advantages are achieved when the material of the present invention exists in separate phases, and the presence of the dopant may foster the formation of such separate phases. Specifically, it has been found that zirconia ($ZrO_2$) or suboxides of zirconium may not fully incorporate into the lattice of the nonoxide ceramics of the present invention and will form a nanodispersed phase of oxide through the material. Furthermore, the presence of the oxide, in many cases, will cause the host ceramic material to also exist as a nanophase dispersion. Within the context of this disclosure, a nanodispersed phase is understood to be a phase comprised of regions having an average diameter of less than 10,000 angstroms, and most preferably less than 5,000 angstroms. The presence of the nanodispersed phase appears to reduce the activation energy required for a lithium diffusion, thereby enhancing the performance characteristics of the material.

The materials of the present invention have a number of utilities as electrode materials, catalysts and the like owing to their stability, good electrical conductivity and novel electronic properties. As discussed above, one particularly important application is as a cathode material for rechargeable lithium batteries. The materials of the present invention may be incorporated into electrodes by techniques well known in the art. As such, the materials are typically disposed on an electrically conductive support such as a metal foil, mesh or the like. While the materials of the present invention may be directly deposited as thin films or formed layers, in many instances they are preferably utilized in the form of a powder, which optionally includes binder materials and the like. In one particularly preferred embodiment, the materials are ground into a fine powder typically having a particle size of less than 25 microns. This powder is mixed with 5 to 25% carbon (preferably acetylenic carbon) and an inert binder material such as fluoropolymer particles.

One particularly preferred material of the present invention comprises a lithium vanadium nitride doped with zirconium, and most preferably with a mixture of zirconium and a zirconium oxide, and in some instances zirconium nitrides or oxynitrides. In materials of this type, it has been found that zirconium incorporates into the vanadium nitride lattice, and causes a lattice expansion or distortion which facilitates lithium transport therethrough. In addition, zirconium is a p dopant material and enhances the electrical conductivity of the vanadium nitride matrix. Zirconium is generally miscible into vanadium nitride at concentrations of up to approximately 6 atomic percent. Zirconium oxides tend to form atomically dispersed oxide networks which lead to nanodispersed oxide regions. These create lattice discontinuities and perturbations which provide paths for lithium ion transport. As a result, the lithium diffusion through this material is very good, and batteries incorporating this material have both high capacity and high rates of charge and discharge. In addition, the lattice structure of these materials is very stable through repeated lithium insertions and removals, and consequently, batteries incorporating such materials have a long cycle life. In one particularly preferred embodiment, the value of $\beta$ for the dopant species is approximately 0.06.

Electrolyte degradation is a problem encountered when batteries which incorporate prior art oxide based cathodes are operated at high temperatures, or under high current flow conditions which cause electrolyte heating. The nitrogen containing materials of the present invention are far less prone to cause such electrolyte degradation, thus extending battery life. This effect is found even when the electrode material includes large amounts of oxide based ceramic, provided that the nitrogen based ceramic coats a majority of the outer surface of the oxide particles. Thus, the materials of the present invention can be used as protective coatings on prior art electrodes, in particular for high temperature and/or high current applications.

The materials of the present invention may be fabricated by conventional techniques well known in the art as used for the fabrication of ceramics, and particularly nonoxide ceramic materials. In one such group of techniques, an oxide based precursor material is first fabricated, and subsequently transformed into a nitride or other nonoxide ceramic material by treatment with an appropriate chemical reagent, for example by high temperature reaction of the oxide under a stream of nitrogen containing gas. Techniques of this type are disclosed in U.S. Pat. No. 5,680,292, the disclosure of which is incorporated herein by reference. One particularly preferred technique is a sol-gel procedure wherein metal alkoxides are reacted in solution to form a gel of metal oxide materials. This gel is then dried to produce a solid material, which in turn is reacted in a nitriding atmosphere to produce the material of the present invention. In the course of such reactions, different components may convert from the oxide to the nitride at different rates, and this can be beneficial to the practice of the present invention. For example, in the preparation of the above-described zirconium doped lithium vanadium nitride material, oxides of the metals are first formed and subsequently nitrided. Nitridation of vanadium oxide takes place at approximately 600° C., while nitridation of zirconium oxide takes place at approximately 1600° C. Therefore, the conversion process may be carried out at an intermediate temperature, in which instance, a significant portion of the zirconium will still be present as an oxide. This will produce the above-described nanophase dispersed mixed dopant. Similar results will be achieved utilizing other transition metals, particularly scandium, yttrium, hafnium and lanthanum. Sol-gel fabrication techniques are disclosed in a number of prior art references, for example in U.S. Pat. No. 5,837,630, the disclosure of which is incorporated herein by reference.

The general principles of the present invention, and characteristics of the materials, will be illustrated with reference to a particular group of materials comprised of lithium, vanadium, zirconium, as well as its oxide, and nitride. It is to be understood that this experimental series is illustrative of the present invention and not limiting upon the practice thereof. Other compositions are encompassed by the present invention, and their compositions, uses, properties and syntheses will be apparent herefrom.

One procedure for the fabrication of the materials of the present invention is disclosed herein, and it is to be understood that other procedures may also be implemented. In this synthesis a zirconium/zirconia doped lithium vanadium nitride material was prepared as follows: 2.44 g of vanadium triisopropoxide was placed in a 100 ml beaker. A solution of 0.31 g of zirconium tetra-n-propoxide, 0.11 ml of ethanol and 0.06 g of acetylacetone was added to the vanadium alkoxide in a dropwise manner. This produced a clear yellow solution. 1 ml of a solution of 0.475 g of lithium methoxide in 5 ml of methanol was added to the yellow solution. This resulted in the production of an orange color, and the solution became slightly cloudy after one minute. The remainder of the lithium methoxide solution was added and resulted in the formation of a cloudy orange solution having a very fine white precipitate therein. Two drops of a solution of 0.67 ml of water in 1.00 ml of ethanol was added and produced a white precipitate; thereafter, 0.6 ml of the water/ethanol solution was added and produced a large amount of white precipitate that slowly dissolved. The remainder of the alcohol solution (approximately 1.1 ml) was added to the solution and resulted in the production of a white gel-like precipitate, and no free liquid was visible in the beaker. This gel was evaporated to dryness under a stream of nitrogen and left a porous yellowish powder comprising an oxide mixture of lithium, vanadium and zirconium.

In a second step of the process, this oxide material was converted, at least in part, to a nitride material by treatment at elevated temperature with an ammonia atmosphere. Specifically, the material was placed in a reaction boat in a tube furnace, and an atmosphere of 200 cc/min of ammonia flowed therethrough. The temperature of the material was raised from room temperature to 300° C. over approximately one hour, and then taken to 600° C. over approximately three hours. The temperature was maintained at 600° C. for two hours, and the material then quenched by cooling to approximately 70° C. over the time of one-half hour, with the flow of ammonia being maintained during all of the foregoing steps. The tube was then flushed with argon flowing at a rate 100 cc/min. until it cooled to approximately 50° C., at which time the argon atmosphere was replaced with an atmosphere of 1% oxygen in helium flowing at a rate of 50 cc/min. This atmosphere serves to passivate the surface of the material, and is typically applied for approximately twenty minutes. The thus produced material comprises a doped ceramic of the present invention.

In the process, the ammonia atmosphere serves to convert various of the oxide materials to their corresponding nitrides; although, it is to be understood that some oxide may remain in the material, particularly in the core of particles, and the dopant zirconium is present as free metal and/or oxide. It will be appreciated that other materials can be fabricated by changing the amounts and/or types of reactants employed. Also, the conversion process can be implemented utilizing other reagents than ammonia.

A series of materials of the general composition LiVZrON were prepared by a sol-gel process as previously described. Samples were subjected to powder x-ray diffraction analyses. The x-ray patterns are consistent with a material comprised of a VN phase together with a separate phase based on $ZrO_2$. Data further suggests that some Zr is doped into the VN structure, as may be some portion of the $ZrO_2$. The x-ray diffraction data further suggests that in some instances, portions of the lithium vanadium oxide material produced in the sol-gel process remain unconverted after nitridation. These unconverted oxide materials, when they are present, are believed to form a core, surrounded by converted nitride materials. Therefore, it is to be understood that the materials of the present invention may, in some instances, include portions of oxide material, separate from any oxide dopant.

The x-ray diffraction data further shows a peak indicative of a shift in the diffraction of some of the VN matrix, and this peak is consistent with the presence of expanded portions of the VN lattice resultant from lattice expansion by Zr. All x-ray data is consistent with the material being configured such that a portion of the dopant material, most probably metal, inserts in and expands the transition metal nitride matrix, while remaining portions of the dopant, most probably metal oxide, serve to create an additional nanodispersed phase. Also, unconverted oxide material can create yet another nanodispersed phase which may be distinct from the other phases or incorporated thereinto.

Scanning electron microscopy was carried out on these materials, using a JEOL T300 scanning electron microscope. No separate phases were noted in the material. The resolution limit of this microscope, under the operating parameters employed, was approximately 500 nanometers; therefore, to the extent that multiple phases are present they must be smaller than 500 nanometers. Hence, those materials which x-ray diffraction indicated were multi-phase, must be nanophase dispersed.

The electrochemical properties of the thus prepared materials were evaluated. The materials were fabricated into sample cathodes. The cathode fabrication protocol included sieving the material to an upper limit particle size of 25 microns (500 mesh), the addition of 5% by weight acetylene black, and the addition of 10% by weight fluoropolymer (Teflon). These materials were pressed onto aluminum current collectors and incorporated into Swagelok battery cells and tested on an Arbin eight channel automated battery tester. The cells were cycled between 1.5V and 4.0V at 25° C. using a 1:1 PC:EC+1M $LiPF_6$ electrolyte, and lithium metal as the anodes. Cyclic voltammetry was performed immediately after fabricating the battery (before constant current cycling) and using a two electrode configuration and a scan rate of 0.2 mV/sec.

In a first evaluation, the effect of dopant concentration was assessed. A series of samples were prepared in which the dopant level, as indicated by the subscript $\beta$ in the above formula, was varied. Samples were prepared in which the value of $\beta$ was 0, 0.06, 0.09, 0.18, 0.24 and 0.42. Constant current cycling was carried out at different rates ranging up to 12 hours, and it was found for all rates, the 0.06 $\beta$ material demonstrated the highest charge capacity as measured in milliamp hours per gram. In general, the undoped ($\beta=0$) material preformed worse than the doped materials, except that the $\beta=0.42$ material was significantly worse than the undoped material.

Cyclic voltammetry was carried out on all of the above-referenced specimens, and again, the $\beta=0.06$ material was superior to all others, and the $\beta=0.42$ material was inferior to the undoped, $\beta=0$, material.

Structural stability of the material in charging and discharging was assessed using Cu(Kα) x-ray powder diffraction. It was found that only a very small change (less than 0.3°) in the scattering angle $2\theta$ occurs during cycling indicative of maximum expansion of the principal unit cell of the material being only approximately 0.03 angstroms. This indicates that the structural integrity of host lattice is preserved during lithium insertion.

The lithium diffusion coefficient of the $\beta=0.06$ material was found to be in the range of $1\times10^{-9}$ to $10\times10^{-9}$ $cm^2$/sec for uncycled material. This diffusion coefficient was determined by using the galvanostatic intermittent titration technique wherein a constant current pulse is applied to a material and the subsequent open circuit relaxation recorded. The sample was allowed to fully relax to its open circuit potential between successive pulses, and diffusion coefficients were calculated according to the following equation:

$$D = \frac{4L^2}{\pi\tau}\left(\frac{\Delta E_\delta}{\Delta E_\tau}\right)^2$$

where D is the diffusion coefficient, L is the cathode thickness, $\tau$ is the pulse duration, $\Delta E_\delta$ is the change in open circuit potential and $\Delta E_\tau$ is the transient potential difference between the beginning and end of the pulse neglecting the ohmic potential drop.

In a further evaluation, the effect of particle size on cell performance was determined. One cell was prepared from a material having random particle size, and another from material sieved so as to include particles having an upper size limit of 25 microns. The charge capacity of the sieved material was generally higher than the random particle size material. It was also noted that performance, as measured by charge capacity, increased to some degree as the amount of acetylenic carbon in the binder was increased from 5 to 10 weight percent. This effect was generally modest, and higher at high charge/discharge rates.

The $\beta=0.06$ material was compared with prior art $LiCoO_2$, $LiNiO_2$ and $LiMn_2O_4$ materials which currently dominate the market for lithium battery cathodes. The average capacity of the materials of the present invention exceeds that of the prior art by 10%, 12% and 32% respectively. The materials of the present invention were compared with $LiCoO_2$ electrode materials, and it was found that the materials of the present invention are far less likely to cause degradation of electrolytes at elevated temperatures.

The foregoing is illustrative of the general principles of the present invention, and in view thereof, it will be understood and appreciated that yet other materials may be fabricated utilizing other transition metals in place of the vanadium and using other dopant metals and oxides. Other such systems will have different optimum values for the dopant level, and such values may be readily determined without undue experimentation in view of the teaching presented herein. Therefore, it is to be understood that the foregoing discussion and examples are illustrative of specific embodiments of the invention, but not limitations upon the practice thereof. It is the following claims, including all equivalents, which define the scope of the invention.

What is claimed is:

1. A transition metal based ceramic material having the general formula $Li_\alpha M_{1-\beta}T_\beta N_xO_\delta$ wherein M is vanadium; T is a dopant which is a Group III or Group IV transition metal; x is greater than 0 and less than or equal to 1; $\delta$ is 0, or less than or equal to 4; $\alpha$ is less than or equal to 3-x; and $\beta$ is less than 0.2.

2. The material of claim 1, wherein said dopant metal is selected from the group consisting of scandium, yttrium, lanthanum, zirconium, hafnium, titanium, and combinations thereof.

3. The material of claim 1, wherein said dopant metal comprises zirconium.

4. The material of claim 3, wherein a portion of said zirconium is present in said material as a compound selected from the group consisting of zirconium oxide, zirconium nitride and combinations thereof.

5. The material of claim 1, wherein at least a portion of said dopant metal is present as an oxide of said dopant metal, and at least a portion of said oxide is present as a nanodispersed phase disposed in the remainder of said material.

6. The material of claim 1, wherein said dopant metal is zirconium, and wherein $\beta$ is 0.06.

7. A rechargeable lithium battery wherein a cathode of said battery is comprised of a transition metal based ceramic material having the general formula $Li_\alpha M_{1-\beta}T_\beta N_xO_\delta$ wherein M is vanadium; T is a dopant which is a Group II or Group IV transition metal; x is greater than 0 and less than or equal to 1; $\delta$ is 0, or less than or equal to 4; $\alpha$ is less than or equal to 3-x; and $\beta$ is less than 0.2.

8. The battery of claim 7, wherein said cathode comprises a pressed body of particles of said ceramic material, said particles having a size of no more than 25 microns.

9. The battery of claim 7, wherein said cathode comprises a pressed body formed of particles of said ceramic material together with particles of carbon.

10. The battery of claim 9, wherein said carbon comprises acetylenic carbon.

11. The battery of claim 9, wherein said pressed body further includes a fluoropolymer.

12. A transition metal based ceramic material having the general formula $Li_\alpha M_{1-\beta}T_\beta N_xO_\delta$ wherein M is a transition metal and T is a dopant metal comprising zirconium; x is greater than 0 and less than or equal to 1; $\delta$ is 0, or less than or equal to 4; $\alpha$ is less than or equal to 3-x; and $\beta$ is greater than 0 and less than 0.2.

13. The material of claim 12, wherein M is vanadium.

14. The material of claim 12, wherein at least a portion of said dopant metal is present as zirconia.

15. The material of claim 14, wherein $\beta$ is 0.06.

16. The material of claim 12 wherein $\delta$ is less than or equal to 2.

17. An electrode comprising the material of claim 12.

18. A transition metal based ceramic material having the general formula $Li_\alpha M_{1-\beta}T_\beta N_xO_\delta$ wherein M is vanadium; T is a dopant metal, wherein at least a portion of said dopant metal is present as an oxide of said dopant metal, and at least a portion of said oxide is present as a nanodispersed phase disposed in the remainder of said material; x is greater than 0 and less than or equal to 1; $\delta$ is 0, or less than or equal to 4; $\alpha$ is less than or equal to 3-x; and $\beta$ is less than 0.2.

* * * * *

UNITED STATES PATENT AND TRADEMARK OFFICE
CERTIFICATE OF CORRECTION

PATENT NO.    : 6,190,802 B1  
DATED         : February 20, 2001  
INVENTOR(S)   : Daryl Clerc et al.

Page 1 of 1

It is certified that error appears in the above-identified patent and that said Letters Patent is hereby corrected as shown below:

<u>Column 7,</u>
Line 50, after "is" insert -- greater than 0 and --.

<u>Column 8,</u>
Line 16, replace "II" with -- III --.
Line 20, after "is" insert -- greater than 0 and --.

Signed and Sealed this

Twenty-ninth Day of January, 2002

*Attest:*

*Attesting Officer*

JAMES E. ROGAN
*Director of the United States Patent and Trademark Office*